(No Model.)
M. BURTON.
ANIMAL TRAP.
No. 458,218.  Patented Aug. 25, 1891.
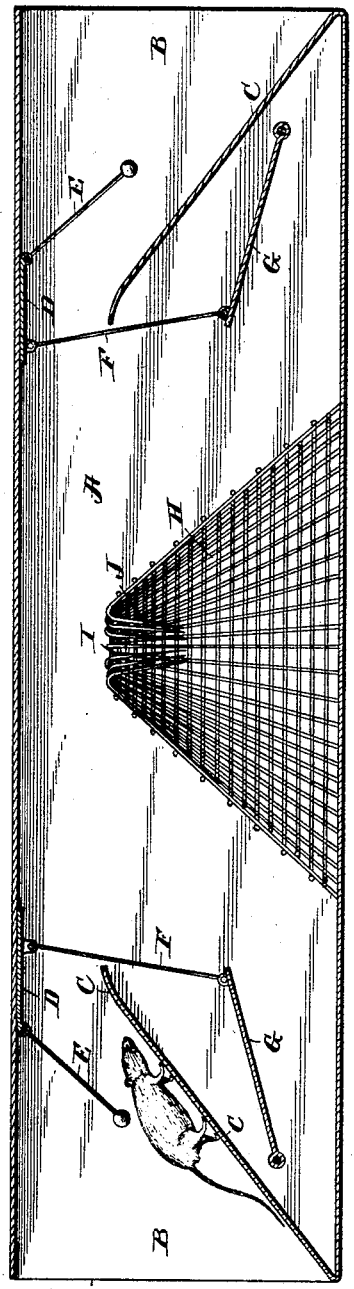
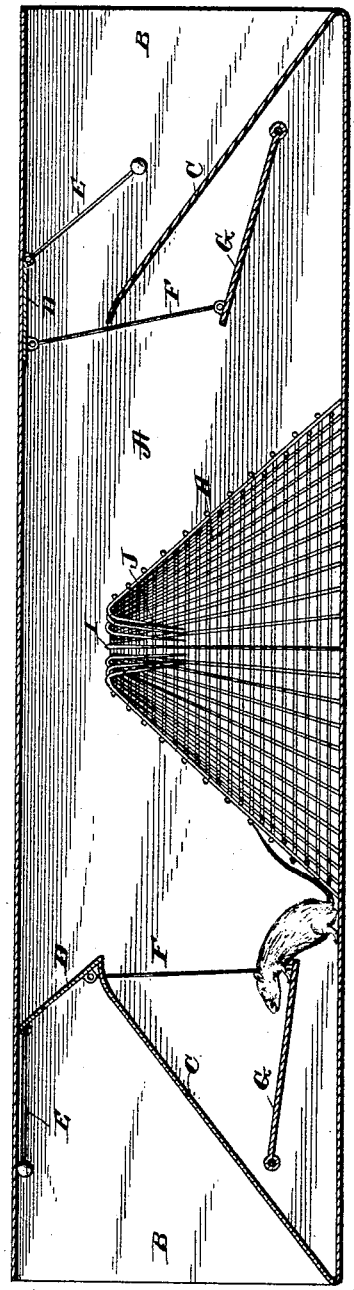
Witnesses:
Wm M. Rheem
E. Wurdeman
Inventor
Matthew Burton
By Elliott and Onohundro
Attys.

UNITED STATES PATENT OFFICE.

MATTHEW BURTON, OF CHICAGO, ILLINOIS.

ANIMAL-TRAP.

SPECIFICATION forming part of Letters Patent No. 458,218, dated August 25, 1891.

Application filed November 4, 1890. Serial No. 370,290. (No model.)

*To all whom it may concern:*

Be it known that I, MATTHEW BURTON, a citizen of the United States, and a resident of the city of Chicago, county of Cook, and State of Illinois, have invented certain new and useful Improvements in Animal-Traps, of which the following is a specification.

This invention relates to improvements in that class of animal-traps known as "automatic" or "self-setting" traps, from the fact that they are always set and are capable of catching in succession any number of animals, limited only by the capacity of the retaining-cage of the trap.

The prime object of this invention is to have a trap the entrances of which are normally open or unobstructed, permitting free access to the interior of the trap, but which will be immediately closed by the entrapped animal in any effort to escape from the trap.

Another object is to combine with such a trap a gatherer or retaining-cage, which, when once the animal enters therein, serves to effectually prevent all further attempts at escape through the entrance by which it gained admission to the trap.

These objects are attained by the devices illustrated in the accompanying drawings, in which—

Figure 1 shows a central section through an animal-trap embodying my invention, showing the position of the parts when an animal is in the act of entering the same; and Fig. 2, a similar view showing the closing of the entrance by the animal in his efforts to escape.

Similar letters of reference indicate the same parts in the several figures of the drawings.

Referring by letter to the accompanying drawings, A indicates the main body of the trap of any suitable dimensions and contour, which, while illustrated in the drawings as composed of sheet metal for clearness, is preferably composed of wire, as usual in this class of devices.

This trap is provided with as many entrances B as may be found desirable, in each of which is located the following mechanisms: An inclined platform C, extending from the floor upwardly a suitable distance at an inclination to render it easy of ascent to animals, above which is hung on a pivot a door D, normally elevated or swung up to a horizontal position, so as not to obstruct entrance to the body of the trap, by means of a weighted arm E or some equivalent device attached directly thereto or to some other member connected therewith. This door is connected by a rod F with a pivoted platform or trigger G, extending under the inclined platform, the forward edge of which terminates below and about in a vertical line with the platform and about a distance above the floor of the trap equal to the reach of the animal intended to be caught when reared on its hind legs, the inclined platform, of course, being above the reach of the animal. Thus the animal in entering the trap, attracted by the scent of the bait, ascends the platform and jumps into the trap from the upper edge thereof through the open entrance; but immediately it undertakes to escape through the same or any other entrance and jumps upon the pivoted platform G, or places its forepaws upon the edge thereof, this platform or "trigger," as I prefer to call it for clearness, through its connection with the door serves to instantly swing the latter down and effectually close the entrance, thus preventing the escape of the animal.

In order to gather the entrapped animals and prevent their continued efforts at escape, which would serve to frighten other animals, I provide within the trap a gatherer or retaining-cage H of any suitable dimensions and contour, but preferably having the shape of a truncated cone, with an entrance I at the top thereof guarded by inwardly-projecting spear-points J, through which the entrapped animal in its efforts to escape will enter the gatherer and be thereby prevented from any further efforts at escape through the entrances.

A trap made in accordance with my invention is simple, effectual, and economical and possesses numerous advantages, chief among which is the fact that it has no parts which are likely to become easily deranged or inoperative, and when once an animal is entrapped it cannot possibly escape therefrom, even though it refuses to enter the gatherer, for it cannot reach the entrance-way without first bearing upon the trigger, which results in instantly closing the entrance-way against the possibility of escape. Furthermore, any number of entrances may be provided for the trap, through none of which can the entrapped animal escape and none of which are connected with or affected by the operation of the others.

In conclusion I may state that I do not desire to limit myself to the exact construction, arrangement, and operation of the parts herein shown and described, for obviously these may be varied without a material departure from the spirit of my invention—such, for instance, as changing the location or disposition of the pivoted platform or trigger, and also the position and manner of operation of the door, but so long as the door adapted and arranged to close the entrance to the trap is normally held open and capable of operation by the entrapped animal through the instrumentality of the trigger such variations would come within the scope of my invention.

Having described my invention, what I claim, and desire to secure by Letters Patent, is—

1. In an animal-trap, the combination, with a fixed inclined platform located in the entrance to the trap, of a normally-open door for closing the entrance and a pivoted platform or trigger located within the trap and connected with the door, so as to operate the same, substantially as described.

2. In an animal-trap, the combination, with a fixed inclined platform located in the entrance to the trap, of a pivoted door located above said platform and adapted to close the entrance, but normally held open by a weight or its equivalent, and a pivoted platform or trigger located within the trap and connected with the door, so as to actuate the same, substantially as described.

3. In an animal-trap, the combination, with a fixed inclined platform located in the entrance to the trap, of a pivoted door located above said platform and adapted to close the entrance, but normally held open by a weight or its equivalent, a pivoted platform or trigger extending beneath the inclined platform, the forward edge of which terminates substantially in a vertical plane with the edge of the platform, and a rod connecting said trigger and door, substantially as described.

4. In an animal-trap, the combination, with a fixed inclined platform located in the entrance to the trap, a normally-open door adapted and arranged to close the entrance, and a trigger located within the trap connected with so as to actuate said door, of a gatherer or retaining-cage located within the trap, substantially as described.

MATTHEW BURTON.

Witnesses:
W. R. OMOHUNDRO,
R. C. OMOHUNDRO.